(12) United States Patent
de Lira Garza et al.

(10) Patent No.: US 9,218,177 B2
(45) Date of Patent: Dec. 22, 2015

(54) TECHNIQUES TO OPTIMIZE UPGRADE TASKS

(75) Inventors: Roberto de Lira Garza, Bellevue, WA (US); Deepak Kumar, Redmond, WA (US); Zhonghua Chu, Redmond, WA (US); Richard Moerloos, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 943 days.

(21) Appl. No.: 13/072,465

(22) Filed: Mar. 25, 2011

(65) Prior Publication Data

US 2012/0246659 A1   Sep. 27, 2012

(51) Int. Cl.
*G06F 9/46* (2006.01)
*G06F 9/445* (2006.01)

(52) U.S. Cl.
CPC ........................................ *G06F 8/65* (2013.01)

(58) Field of Classification Search
None
See application file for complete search history.

(56) References Cited

U.S. PATENT DOCUMENTS

| | | | |
|---|---|---|---|
| 7,539,625 B2 * | 5/2009 | Klumpen et al. ............ 705/7.22 |
| 2002/0059260 A1 * | 5/2002 | Jas ............................... 707/100 |
| 2003/0070157 A1 * | 4/2003 | Adams et al. ................. 717/101 |
| 2004/0244005 A1 * | 12/2004 | Ancier ........................... 718/103 |
| 2005/0204358 A1 * | 9/2005 | Hellerstein et al. ........... 718/104 |
| 2007/0136731 A1 * | 6/2007 | Bennington et al. .......... 718/103 |
| 2007/0174261 A1 * | 7/2007 | Kuboyama et al. ................ 707/3 |
| 2008/0098046 A1 | 4/2008 | Alpern et al. |
| 2008/0300851 A1 * | 12/2008 | Chakrabarti et al. ........... 703/22 |
| 2009/0070772 A1 * | 3/2009 | Shikano ......................... 718/106 |
| 2009/0100430 A1 * | 4/2009 | Valentin et al. ............... 718/102 |
| 2009/0241117 A1 * | 9/2009 | Dasgupta et al. ............. 718/101 |
| 2010/0153977 A1 * | 6/2010 | Valentin ......................... 719/328 |
| 2011/0067030 A1 * | 3/2011 | Isard et al. .................... 718/102 |
| 2011/0208750 A1 * | 8/2011 | Miyazaki ....................... 707/748 |
| 2011/0246998 A1 * | 10/2011 | Vaidya et al. ................. 718/103 |
| 2011/0271071 A1 * | 11/2011 | Nakatogawa ................. 711/165 |
| 2011/0292421 A1 * | 12/2011 | Murakoshi ..................... 358/1.9 |
| 2012/0054662 A1 * | 3/2012 | Kieselbach ................... 715/772 |
| 2012/0089967 A1 * | 4/2012 | Varadarajan et al. ......... 717/136 |
| 2012/0137278 A1 * | 5/2012 | Draper et al. ................. 717/170 |

OTHER PUBLICATIONS

"Delivering Value with Oracle E-Business Suite Human Resources Management System Release 12.1", Retrieved at <<http://www.oracle.com/us/products/applications/057153.pdf>>, Apr. 2010, pp. 25.

(Continued)

*Primary Examiner* — Emerson Puente
*Assistant Examiner* — Mehran Kamran
(74) *Attorney, Agent, or Firm* — Thomas Marquis; Stein Dolan; Micky Minhas

(57) ABSTRACT

Techniques to prioritize and optimize the execution of upgrade operations are described. A technique may include determining the size of data blocks that are to be copied from one storage medium to another, and the dependencies of upgrade tasks on the data blocks and on other tasks. A task may be prioritized according to a weight that includes the cumulative sizes of the data blocks that it and its dependent tasks depend on. A data block copying may be prioritized according to the cumulative weights of the tasks that depend on that data block. Some embodiments may perform several data copying and/or tasks in parallel, rather than sequentially. Other embodiments are described and claimed.

19 Claims, 8 Drawing Sheets

(56) References Cited

OTHER PUBLICATIONS

"Microsoft Dynamics AX Optimizing Data Upgrade for Microsoft Dynamics AX 4.0 and 4.0 Service Pack on Microsoft SQL Server", Retrieved at <<http://www.ear-tech.com/Articles/AX40_UpgradeOptimization_SQL.pdf>>, Dec. 2007, pp. 17.

Pallapinti, Swapna, "Oracle E-Business Suite: Upgrade to R12—A Functional View", Retrieved at <<http://www.tarkia.com/blog/2009/12/28/oracle-e-business-suite-upgrade-to-r12-%E2%80%93-a-functional-view/>>, Dec. 28, 2009, pp. 4.

Joffe, David, "How to Reduce Downtime and Risk during your Oracle 11i Upgrade", Retrieved at <<http://www.norcaloaug.com/seminar_archive/2006_training_day_pres/5_9_desiraju.doc>>, 2006, pp. 15.

"SAP Implementation and Upgrades", Retrieved at <<http://searchsap.techtarget.com/How-to-minimize-upgrade-downtime-during-SAP-ERP-60-upgrade-projects>>, Apr. 21, 2009, pp. 87.

"Microsoft Dynamics AX How to Write Data Upgrade Scripts for Microsoft Dynamics AX 2009", Retrieved at <<http://download.microsoft.com/download/b/0/5/b057bd6f-5d2c-479b-a5df-cc50eca7834f/How%20to%20write%20Data%20Upgrade%-20Scripts%20for%20Microsoft%20Dynamics%20AX%202009.pdf>>, May 14, 2008, pp. 151.

"Prepare Database for Data Upgrade (Pre-synchronize Data Upgrade)", Retrieved at <<http://msdn.microsoft.com/en-us/library/aa548680%28AX.10%29.aspx>>, Retrieved Date: Nov. 18, 2010, pp. 3.

\* cited by examiner

600

```
┌─────────────────────────────────────────┐
│ DETERMINE DEPENDENCIES OF TASKS ON DATA AND │
│   TASKS ON TASKS IN AN UPGRADE PROCESS  │
│                   602                   │
└─────────────────────────────────────────┘
                    │
┌─────────────────────────────────────────┐
│  CALCULATE A TASK WEIGHT OF A TASK IN AN UPGRADE │
│                 PROCESS                 │
│                   604                   │
└─────────────────────────────────────────┘
                    │
┌─────────────────────────────────────────┐
│  CALCULATE A COPY WEIGHT OF A DATA BLOCK TO BE │
│                 COPIED                  │
│                   606                   │
└─────────────────────────────────────────┘
                    │
┌─────────────────────────────────────────┐
│  PRIORITIZE THE COPYING AND THE TASKS IN THE │
│  UPGRADE PROCESS ACCORDING TO THE COPY  │
│  WEIGHT, THE TASK WEIGHT, AND THE DEPENDENCIES │
│                   608                   │
└─────────────────────────────────────────┘
                    │
┌─────────────────────────────────────────┐
│  FOLLOWING THE PRIORITY, COPY THE DATA BLOCKS │
│          AND PERFORM THE TASKS          │
│                   610                   │
└─────────────────────────────────────────┘
```

*FIG. 6*

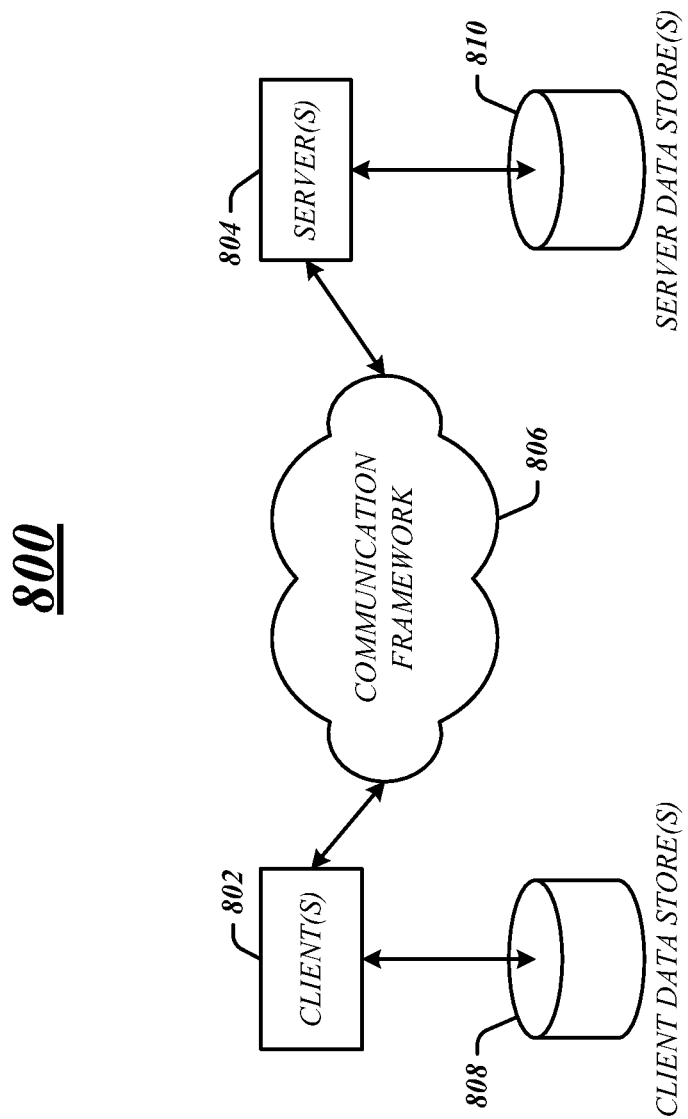

TECHNIQUES TO OPTIMIZE UPGRADE TASKS

BACKGROUND

Upgrading or updating software and/or data on a computer system may include copying large amounts of data from one storage medium to another, and the execution of a number of scripts that use or operate on the data. The order in which data is copied may be essentially random. Post-synchronization tasks that depend on the data to execute cannot be executed until that data is copied. Further, some tasks may depend on other tasks to execute first. The upgrade operations of copying and task execution may occur sequentially. Further, upgrade tasks, apart from dependency consideration, occur essentially randomly. The overall effect of such an upgrade process may be an inefficient use of processing and network resources that prolong an upgrade process and negatively impact productivity. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to optimize an upgrade or update process. Some embodiments are particularly directed to techniques to optimize an upgrade process that includes copying data and executing tasks related to the data by prioritizing process steps according to size and dependencies. In one embodiment, for example, a technique may comprise determining the size of data blocks that are to be copied from one storage medium to another, and the dependencies of upgrade tasks on the data blocks and on other tasks. A task may be prioritized according to a weight that includes the cumulative sizes of the data blocks that it and its dependent tasks depend on. A data block copying may be prioritized according to the cumulative weights of the tasks that depend on that data block. Some embodiments may perform several data copying and/or tasks in parallel, rather than sequentially. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 6 illustrates an embodiment of a logic flow.

FIG. 8 illustrates an embodiment of a communications architecture.

DETAILED DESCRIPTION

Various embodiments are directed to systems and techniques to optimize upgrade tasks. An embodiment may consider the size of a data block, such as a table or a file, and the tasks that depend on that data, to prioritize the ordering of the copying and task execution. An embodiment may perform some of the copying and task execution in parallel. An embodiment may allow the priority of a task or a data copy to be overridden. As a result, the embodiments can improve affordability, scalability, modularity, extendibility, or interoperability for an operator, device or network.

Some computer-implemented applications make use of large quantities of data. The data may be stored in one or more databases. Examples of such applications may include enterprise applications, inventory management applications, etc. The applications may include a client component and a server component. Upgrading the data and/or the application may include copying a new version of the data from one location to a different location. Although the discussion herein references an upgrade process, embodiments may include other processes that include a plurality of copying and task steps that may be prioritized. Such processes may include, for example, a restoration process to restore lost or damaged data, or an update process to update data at a remote site. The embodiments are not limited to these examples.

Figure 1:
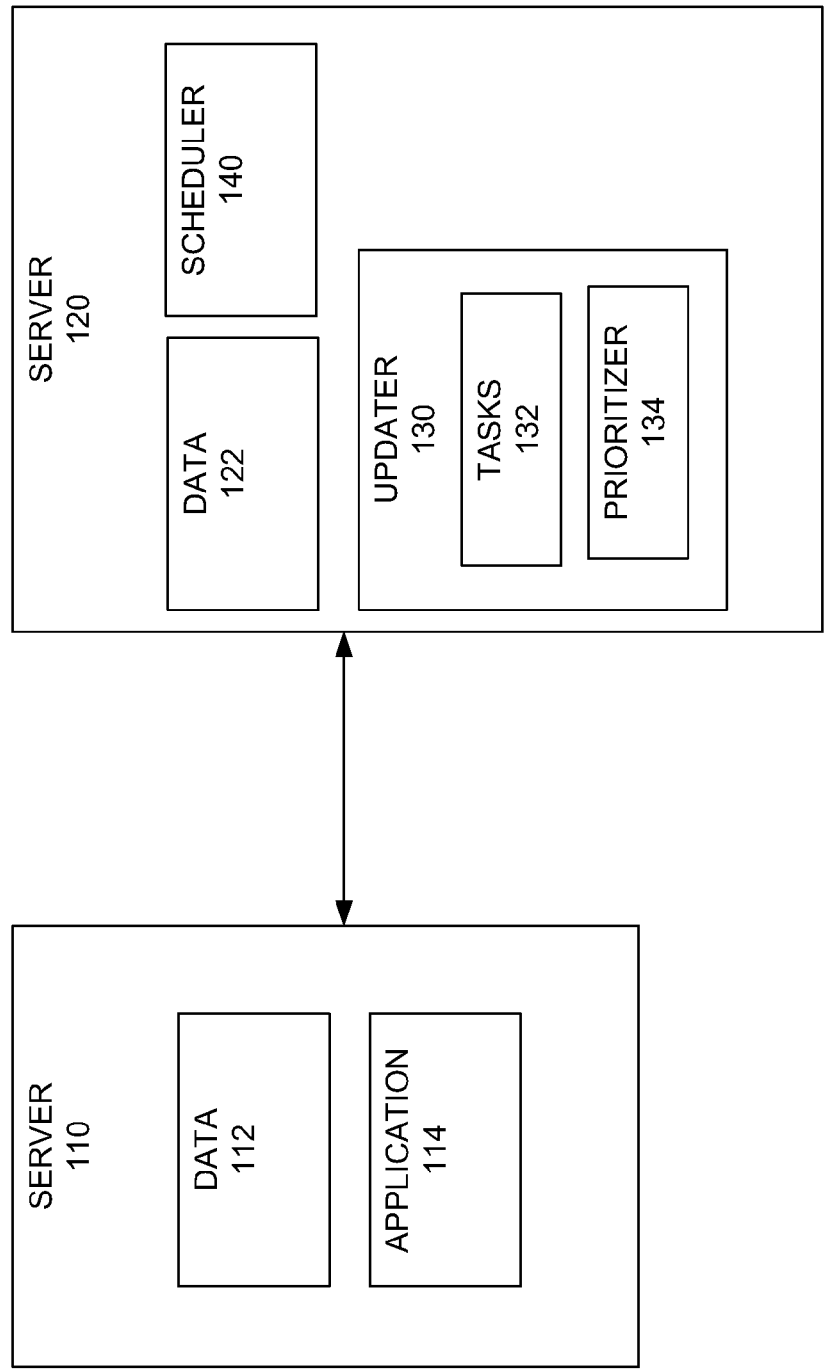
FIG. 1 illustrates an embodiment of a first system to optimize an upgrade process.

FIG. 1 illustrates a block diagram for a system 100 to optimize an upgrade process. In one embodiment, for example, the system 100 may comprise a computer-implemented system 100 having multiple components, such as server 110 and server 120. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented with one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

Server 110 and server 120 may be communicatively coupled via various types of communications media. Server 110 and server 120 may coordinate operations between each other. The coordination may involve the uni-directional or bi-directional exchange of information. For instance, server 110 and server 120 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the system 100 may comprise server 110. Server 110 may be an electronic device. Server 110 may include a computer-readable storage medium that stores data 112. Data 112 may be data stored in one or more data blocks. A data block may be, for example, a database table or a file.

Server 110 may include an application 114 that operates on server 110. Application 114 may use and operate on data 112. Application 114 may be, for example, an enterprise resource planning application, a customer relationship management application, a line-of-business application, or other application that stores, manages and uses large amounts of data. Application 114 may be an interface, e.g. a "dumb" terminal, to application functionality provided by a different device, such as server 120. System 100 may include more than one server 110.

In various embodiments, the system 100 may comprise server 120. Server 120 may provide services for application 114, including an update or upgrade function. Server 120 may perform, for example, processing, backup, and/or management of data. The data may include, for example, personnel data, inventory data, customer data, business records, correspondence, product development data, and so forth.

Server 120 may include data 122. Data 122 may be a copy of data 112, or may be a different version of data 112. For example, data 122 may include more data blocks, fewer data blocks, or differently structured data blocks, as compared to data 112. Data 122 may have the same number and structure of data blocks as data 112, but may contain different data. Data 122 may, for example, contain more recent data as compared to data 112.

Server 120 may include an updater 130. Updater 130 may be a component that upgrades, updates, and/or restores data on a server 110. An upgrade process may include copying data blocks to a target device, such as server 110, and executing tasks on or using the copied data. The combination of copying data blocks and executing tasks may be referred to herein collectively as "upgrade operations."

Updater 130 may include tasks 132. Tasks 132 may include one or more operations or sets of operations to be performed on or using data 122, including post-synchronization operations. The operations may be, for example, scripts, compiled software instructions, interpreted software instructions, applets, macros, firmware instructions, etc. Some tasks may depend on one or more data blocks, meaning that a task may need to have a data block from data 122 copied to server 110 before the task may be executed. Some tasks may depend on other tasks, meaning that one task may need to be executed before a task that depends on it can be executed. In an embodiment, tasks 132 may be executed by server 120 on data 122 after it is copied to server 110. Examples of tasks 232 may include sorting data, analyzing data, correlating data, and so forth.

In an embodiment, updater 130 may be able to perform more than one upgrade operation at a time, in parallel. For example, updater 130 may be able to copy two or more data blocks to server 110 at a time, or may be able to execute one or more tasks while copying one or more data blocks to server 110.

In an embodiment, updater 130 may include a prioritizer 134. Prioritizer 134 may be a component of updater 130, or may operate as a stand-alone application or process on server 120. Prioritizer 134 may examine data 122 and tasks 132 and their dependencies to prioritize an order for the upgrade operations. In an embodiment, prioritizer 134 may consider the size of a data block, the number of tasks that depend on a data block, the number of data blocks that a task depends on, the size of the data blocks that a task depends on, the number of tasks that depend on a task, the number of tasks that a task depends on, or any combination thereof to determine an order in which to perform the upgrade operations. In an embodiment, prioritizer 134 may additionally analyze and consider other factors, such as network conditions and/or hardware configurations in prioritizing upgrade operations. In an embodiment, prioritizer 134 may prioritize the upgrade operations in a sequential upgrade order. In an embodiment, prioritizer 134 may prioritize the upgrade operations into an upgrade order according to a specified number of parallel operations that may occur.

In an embodiment, server 120 may include a scheduler 140. Scheduler 140 may be a component of updater 130, or may operate as a stand-alone application or process on server 120. Scheduler 140 may receive the prioritized upgrade order and begin the upgrade operations according to the order. In an embodiment, scheduler 140 may request or receive a number of available parallel processing resources, for example, processor threads, and may allocate the upgrade operations, in order, to each available processing resource. For example, if five threads are available, scheduler 140 may start each of the first five upgrade operations in a respective one of the threads. When an upgrade operation finishes and the processing resource becomes available, scheduler 140 may select the next upgrade operation in the priority order that has also had its dependencies met. In the above example, if the sixth upgrade operation is a task that depends on a data block that is still being copied, then scheduler 140 may skip the sixth operation and select the seventh upgrade operation.

Figure 2:
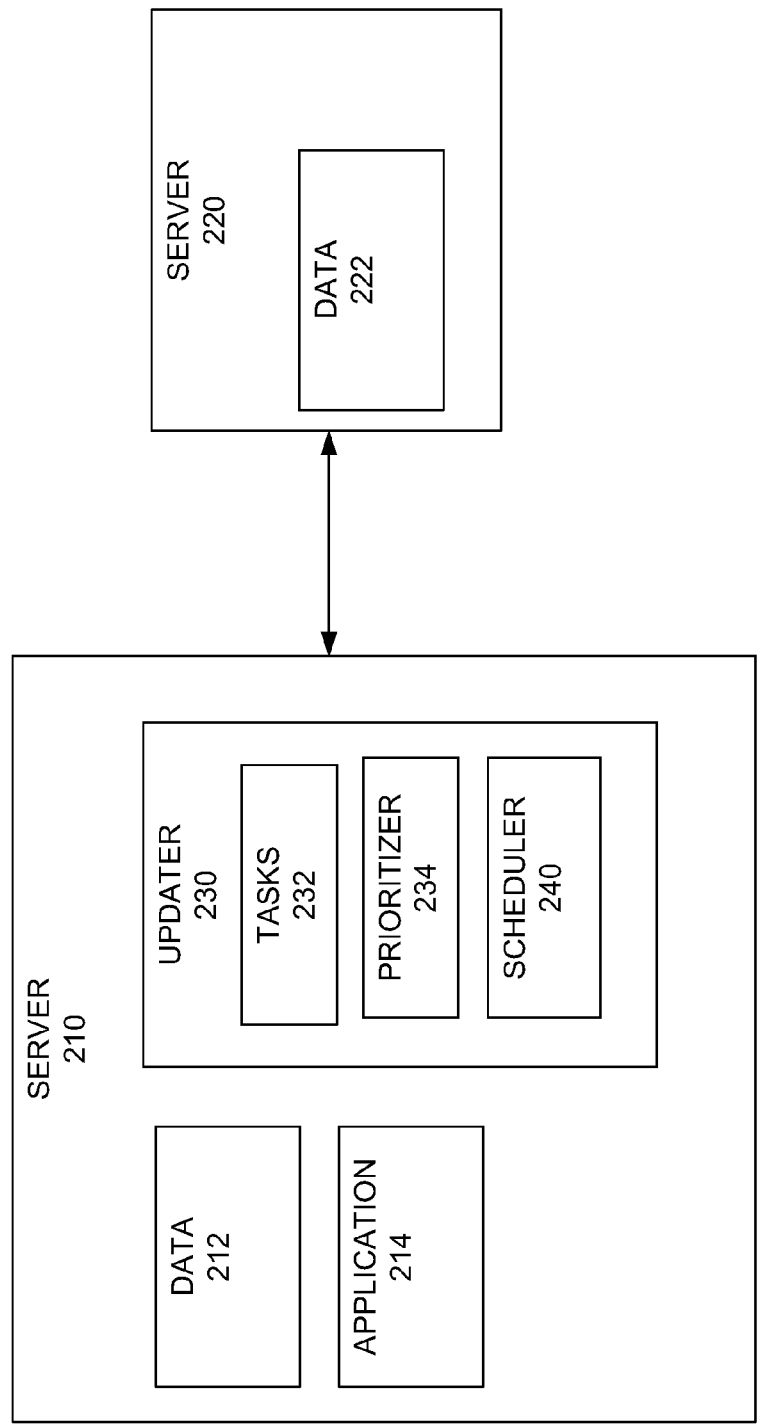
FIG. 2 illustrates an embodiment of a second system to optimize an upgrade process.

FIG. 2 illustrates a block diagram of a system 200 to optimize an upgrade process. The system 200 may be similar to the system 100, but may include an updater 230 on server 210, rather than on server 220. In system 200, updater 230 may fetch data 222 from server 220 during an upgrade operation. Updater 230 may execute tasks 232 locally, on server 210, on the fetched data. If tasks 232 are equivalent to tasks 132 in system 100, and data 222 is equivalent to data 122 from system 100, then prioritizer 234 may prioritize the tasks and data copying differently than prioritizer 134. For example, if tasks 232 are to be executed by server 210, the hardware configuration of server 210, as compared to server 120, may suggest a different ordering to optimize upgrade operations.

Scheduler 240 may receive the prioritized upgrade order and begin the upgrade operations from server 210 according to the order. In an embodiment, scheduler 240 may request or receive a number of available parallel processing resources on server 210, for example, processor threads, and may allocate the upgrade operations, in order, to each available processing resource. The resulting actual order of completion of the copying and tasks in system 200 may differ from those in system 100, in particular if server 210 has a different number of processing resources available to it compared to server 120, or if server 210 has a different hardware configuration such that the copying and/or tasks are completed at a different speed compared to server 120.

Figure 3:
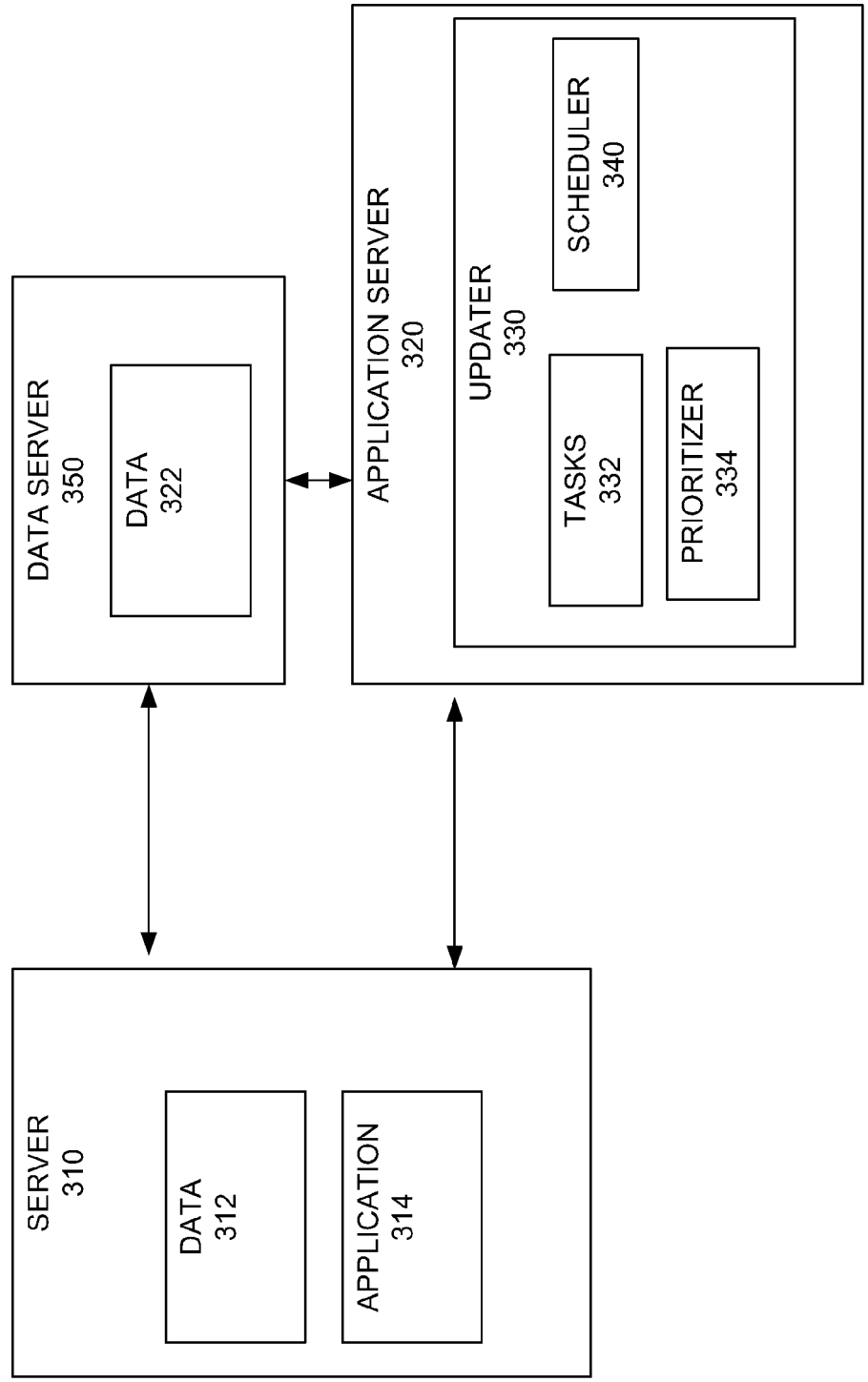
FIG. 3 illustrates an embodiment of a third system to optimize an upgrade process.

FIG. 3 illustrates a block diagram of a system 300 to optimize an upgrade process. The system 300 may be similar to the systems 100 and 200. System 300 may, however, have a data server 350 that is separate from an application server 320. Data server 350 may store data 322. As with data 122, data 322 may be a copy of data 312 on server 310, or may be a different version of data 312. Data server 350 may be, for example, a backup server, or a centralized data storage for a plurality of client systems.

Application server 320, similarly to server 120, may provide services for application 314, including an update or upgrade function managed by updater 330. Updater 330 may be in communication with data server 350, and may analyze the sizes of data blocks from data 322 that need to be copied to server 310 as part of an upgrade process, similarly to updaters 130 and 230.

Prioritizer 334 may prioritize tasks 332 and copying of data 322 according to the sizes of data blocks and dependencies among tasks and data blocks, as described above. Prioritizer 334 may analyze and consider the hardware and network configurations of application server 320, data server 350, and/or server 310 in determining the priority of tasks and data copying.

Scheduler 340 may receive the prioritized upgrade order and begin the upgrade operations according to the order. As with schedulers 140 and 240, scheduler 340 may request or receive a number of available parallel processing resources, and may allocate the upgrade operations, in order, to each available processing resource. The resulting actual order of completion of the copying and tasks in systems 300 may differ from those in system 100 and 200, for example, if the data transfer rate between data server 350 and server 310 differs from the data transfer rate between application server 320 and server 310.

Figure 4:
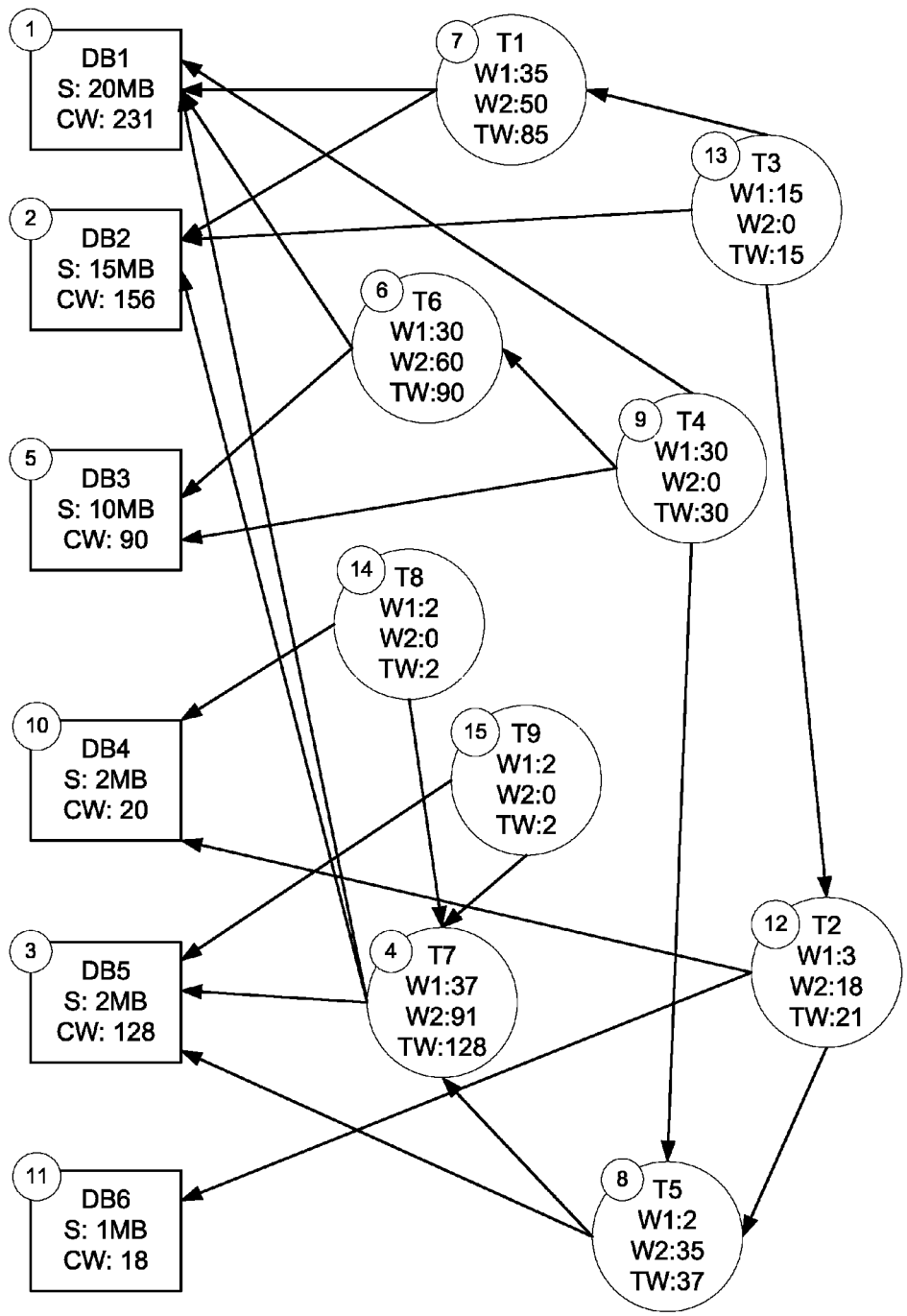
FIG. 4 illustrates an embodiment of a set of data and tasks to optimize.

FIG. 4 is a diagram 400 illustrating an example of a set of upgrade operations comprising tasks and data blocks to copy, and their dependencies. In FIG. 4, data blocks are represented by rectangles, tasks are represented by circles, and dependencies are represented by arrows. The set of operations illustrated in FIG. 4 therefore has six data blocks: D1-D6, and nine tasks, T1-T9. The size of each data block is shown as the "S" value in the data block, for example, D1 has a size of 20 megabytes (MB), while DB5 has a size of 2 MB.

A task may be dependent on one or more data blocks, and/or on one or more tasks. For example, task T6 is dependent on data blocks DB1 and DB3, meaning that DB1 and DB3 must be copied before task T6 can be executed. Task T4, for example, is dependent on task T6 and on data block DB3, meaning that DB3 must be copied, and task T6 completed, before T4 can be executed.

Each task may have a task weight, shown as the "TW" number. In an embodiment, a task weight for a task may be calculated by adding the sizes of all of the data blocks on which the task depends, as a first weight (shown as the "W1" number), and then adding the first weights of all the other tasks that depend on the task (shown as the "W2" number). The task weight may be the sum of W1 and W2. For example, for task T1, W1 is the added sizes of DB1 and DB2, because T1 depends on DB1 and DB2. For T1: W1=20+15=35. T1 is depended on by T3, which has a W1 of 15. The W2 of T1 is W2=35+15=50. The task weight for T1 is TW:35+50=85. Task T3 depends on DB2, and has a W1 of 15. T3 is not depended on by any tasks, so its W2 is zero. The task weight of T3 is TW:15+0=15.

Each data block may have a copy weight, shown as the "CW" number. In an embodiment, the copy weight may be calculated by adding the size of the data block to the W2 values for all of the tasks that depend directly on the data block. For example, DB4 has S=2, and has two tasks that depend directly on it: T8 and T2. T8 has W2=0, and T2 has W2=18. Therefore, the copy weight for DB4 is equal to 2+0+18=20.

In an embodiment, the tasks and data blocks may be prioritized according to the task weight and copy weight, respectively. An example of priority ordering is shown in FIG. 4, represented by the number in the small circle in the upper left of each data block and task. Generally, the data block having the largest copy weight may be assigned the highest priority. The large copy weight, relative to the other data blocks, may reflect the number of tasks that depend on the data block, as well as the size of the data block itself. The remaining data blocks and tasks may be prioritized according to their respective copy weights and task weights.

In FIG. 4, DB1 has first priority, because it has the largest copy weight of 231. DB3 has $5^{th}$ priority, having a copy weight of 90, while T4 has $9^{th}$ priority from its task weight of 30. If two or more upgrade processes have the same value of copy weight or task weight, priority may be determined, for example, according to the respective W1 and size values, or according to the dependencies a process has. For example, in FIG. 4, DB3 and T6 each have a weight of 90. T6 depends on DB3, and therefore has a lower priority than DB3. In other embodiments, the tasks and data blocks may be prioritized according to additional or alternate factors, such as, but not limited to, hardware configurations, network conditions, available processing resources, and so forth.

The priorities assigned to the tasks and data blocks may not necessarily reflect the actual order in which the tasks and data block copying take place. Generally, given N parallel processing resources, the first N upgrade processes might begin together. When one of the upgrade processes finishes and its processing resource becomes available, the scheduler may check the next highest priority upgrade process to see if it can be performed. If, however, the process is dependent on a data block or task that has not completed yet, the scheduler may skip that process and check the next highest priority until a process is found that can be performed. For example, in FIG. 4, DB1, DB2, DB5, T7, and DB3 are the top five highest priority tasks. If the system has four processing resources available, then DB1, DB2 and DB5 will be copied, beginning substantially together. T7, however, depends on DB1, DB2 and DB5, and cannot be performed until those three data blocks are copied. The scheduler may then check the next highest priority item, DB3, and since it does not depend on any other process, the scheduler may cause the copying of DB3 to begin. T7 could be begun as the next process after DB1, DB2 and DB5 are finished copying.

Figure 5:
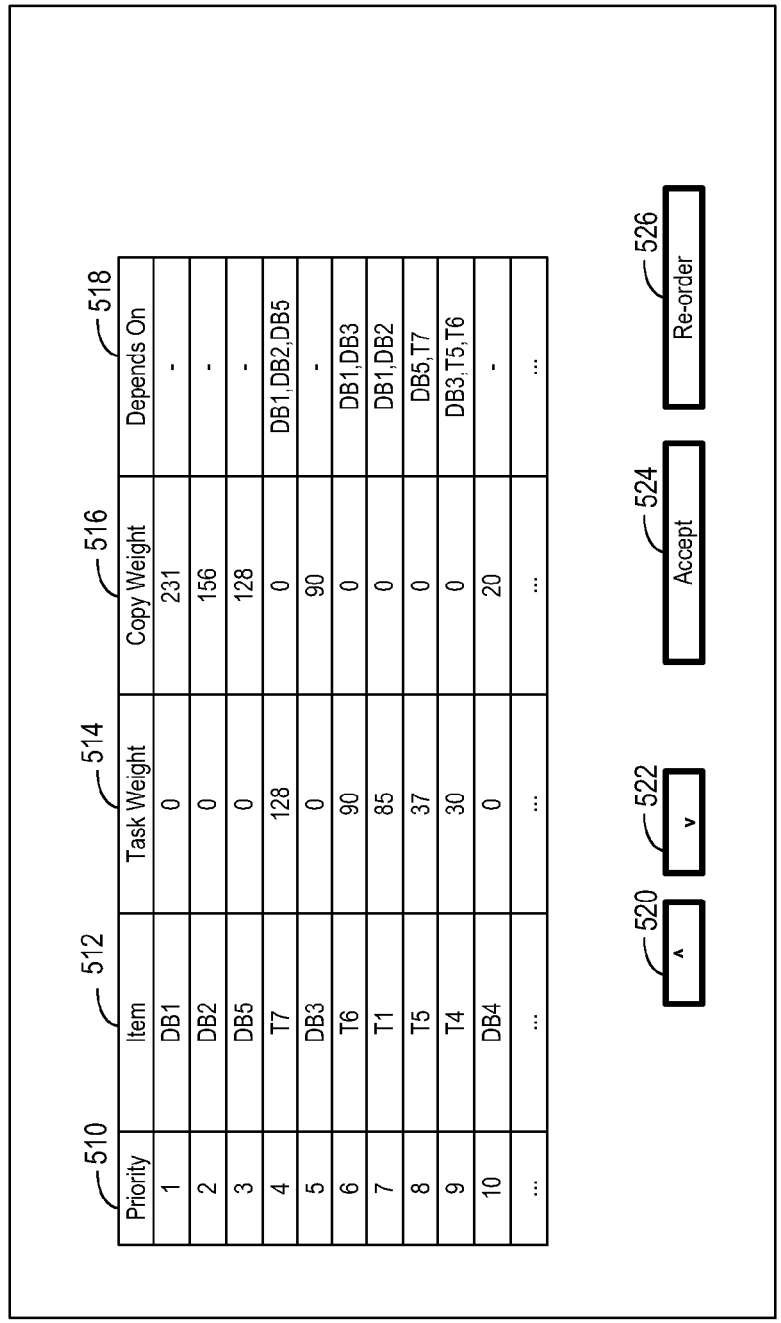
FIG. 5 illustrates an embodiment of a user interface to display a prioritized list.

FIG. 5 illustrates an embodiment of a user interface (UI) 500 showing an example of a prioritized list of the upgrade operations of FIG. 4. UI 500 may display the prioritized list of upgrade operations to a user, for example, an application administrator, and may allow the user to override and re-order the priorities.

UI 500 may display the upgrade operations in a table form having one or more columns and a number N of rows corresponding to the top N prioritizes operations. The columns may include, for example, a priority column 510, an item column 512, a task weight column 514, a copy weight column 516, and a "depends on" column 518. Priority column 510 may identify the priority order assigned to the upgrade operations by the prioritizer. As a default, UI 500 may be sorted in priority order from highest to lowest. In an embodiment, priority column 510 may be omitted from UI 500, with the priority order implied. Item column 512 may include a name or description of the upgrade operation so that the user may be able to identify the task or data table.

Task weight column 514 may show the task weight for the tasks in the list, and may show zero as a value of data tables. Copy weight column 516 may show the copy weight for data tables in the list and may show zero as a value for the tasks in the list. In an embodiment, task weight column 514 and copy weight column 516 may be combined into a "weight" column that shows the respective task and copy weights for tasks and data tables in the list. In an embodiment, UI 500 may not show the weights.

"Depends on" column 518 may list the other tasks and data tables that the item depends on. For example, fourth priority item T7 depends on DB1, DB2, and DB5. This information may be useful for the user in deciding whether to re-order the upgrade operations. In an embodiment, UI 500 may in addition, or in the alternative, display the items that depend on a row item, for example in a "Depended on by" column. In such an embodiment, for example, first priority item DB1 would show T1, T4, T6 and T7 as items that depend on it.

UI 500 may provide a way for the user to change the priority of the displayed items. For example, UI 500 may provide an increase button 520 and a decrease button 522. In an embodiment, increase button 520 and decrease button 522 may only be active after re-order button 526 is selected. Selecting an item in the table and selecting increase button 520 once may increase the priority of the selected item by one, while decreasing the priority of the item above the selected item by one. For example, if fifth priority item DB3 were selected, and increase button 520 were selected once, then DB3 would be re-assigned priority 4, while previously fourth priority item T7 would be assigned priority 5. Decrease button 522 may operate analogously to increase button 520, but to lower an item's priority.

In an embodiment, the priority may be changed, for example, by having the user select, drag and drop an item in the list to a new location corresponding to a different priority with an input device, such as a mouse. In an embodiment, the fields in priority column 510 may be editable, and the user may change the priority by selecting the field and entering a new numeric priority in the field, for example, from a keyboard. In an embodiment, the fields in task weight column 514 and copy weight column 516 may be editable and allow the user to change the copy weight of a data block or the task weight of a task. In an embodiment, a task writer may include an additional weight coefficient to the task, which causes the calculated task weight to be multiplied by the weight coefficient, changing the effective task weight of the task. The weight coefficient may be included in an attribute of the task. The embodiments are not limited to these examples.

Once the priority order is satisfactory to the user either with or without re-ordering, selecting the accept button 524 may close UI 500 and cause the priority information to be provided to the scheduler. The scheduler may then begin the upgrade process according to the accepted priority. In an embodiment, a cancel button may be provided to terminate the upgrade process.

Other embodiments of UIs are possible. For example, a UI may provide the information about the upgrade processes as graphics, such as icons, arranged in an order to shows their priorities. The graphics may be dragged by an input device selection to different priority positions. A UI may display the relationships among the upgrade processes with connecting lines, similarly to those in the diagram in FIG. 4. The embodiments are not limited to the example of UI 500.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may determine the dependencies among the tasks and data blocks of an upgrade process at block 602. For example, updater 130 may examine the code for each upgrade task to determine what data blocks the task needs, and what other tasks need to performed before the task can be performed. In an embodiment, each task may include, for example, a comment that lists its dependencies. In an embodiment, a separate data file may include entries for each task and data block that list what tasks and data blocks depend on the item in the entry. The data file may be, for example, a table, a list, a database, a spreadsheet, and so forth.

In an embodiment, a task may have one or more attributes, which may be specialized classes that, among other functions, apply metadata to other classes and methods. Attributes may be used to publish what other tasks and data blocks a task depends on. Updater 130 may read the information from a task's attributes to determine its dependencies.

The logic flow 600 may calculate a task weight of the tasks in the upgrade process at block 604. For example, prioritizer 134 may calculate a task weight for a task by adding the sizes of all of the data blocks on which the task depends, as a first weight, and then adding the first weights of any other tasks that depend on the task as a second weight. The task weight may be the sum of the first and second weights. For example, if a task depends on a data block that is 15 MB in size, and has a task that depends on it that has a first weight of 30, then the second weight of the task is 15+30=45. The task weight is then 30+45=75.

The logic flow 600 may calculate a copy weight of the data blocks in the upgrade process at block 606. For example, prioritizer 134 may calculate the copy weight by adding the size of the data block to the second weights for all of the tasks that depend directly on the data block. For example, if a data block is 20 MB in size, and has three tasks that depend on it having second weights of, respectively, 10,5, and 2, then the copy weight is 20+10+5+2=37.

In an embodiment, other measures may be calculated, such as how quickly a data block may be copied from device to device, or how long it would take to perform the task on the various devices.

The logic flow 600 may prioritize the upgrade operations according to the task weights, copy weights, and/or the dependencies at block 608. For example, prioritizer 134 may assign the highest priority to the task or data block having the highest weight, either task weight or copy weight, respectively. In the event of equal weights, other factors may be considered, such as number of dependents, whether the process is a data block copy or a task, whether one of the operations depends on the other, or other considerations. In an embodiment, additional or alternate factors may be analyzed and considered in prioritizing upgrade operations. For example, network conditions, hardware configurations, data block structure, and/or other performance-affecting conditions may affect the assignment of priority.

In an embodiment, updater 130 may display a user interface (UI) showing some or all of the upgrade operations with an indication of their priorities. The UI may allow a user to override the assigned priorities of the upgrade operations. In an embodiment, the UI may allow the user to edit the copy weight of a data block or the task weight of a task, or to edit the priority. In an embodiment, the UI may allow the user to remove a task or data block copy operation from the list of upgrade processes.

The logic flow 600 may perform the upgrade operations according to the priorities at block 610. For example, scheduler 140 may obtain a number of processing resources, such as threads, and begin that number of upgrade operations. In an embodiment, priority ordering may be different from execution order. Some higher priority operations may depend on other data blocks or tasks to be completed before they can be executed. Lower priority operations may be performed instead until depended-upon operations are finished and the higher priority operation may be started. For example, when one of the upgrade processes finishes and its processing resource becomes available, the scheduler may check the next highest priority upgrade process to see if it can be performed. If, however, the process is dependent on a data block or task that has not completed yet, the scheduler may skip that process and check the next highest priority until a process is found that can be performed.

Embodiments may therefore take advantage of parallel processing capabilities, and by analyzing dependencies, may optimize the copying and task operations to minimize down time during an upgrade process. The optimization may also preserve functional data integrity by ensuring that data is copied before the tasks that depend on it.

Figure 7:
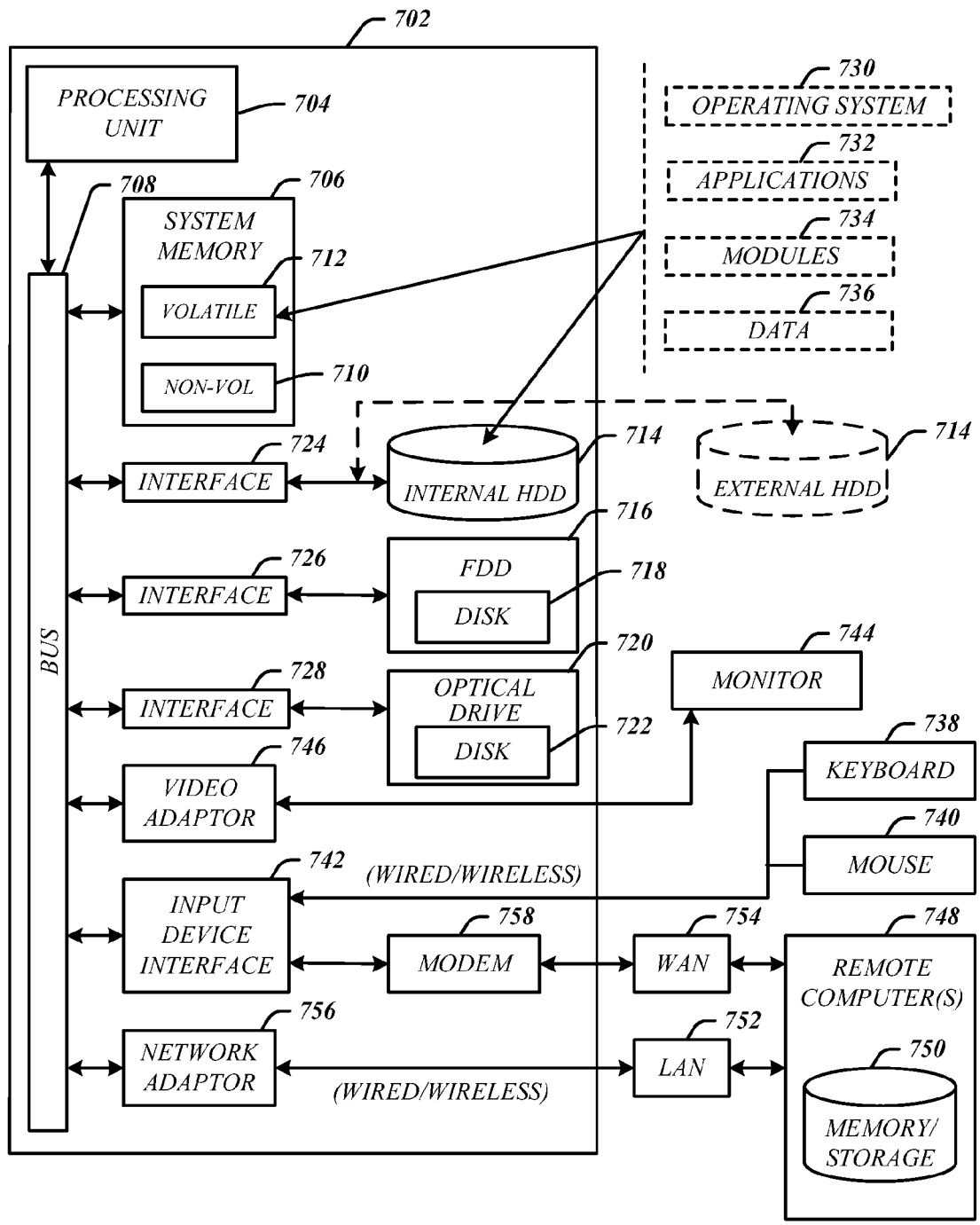
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, application 114, and updater 130.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the server systems 110, 210, and/or 310. The servers 804 may implement the server system 120, 220, 320 and/or 350. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method executing on a computing device, comprising:
   determining the sizes of a plurality of data blocks to copy from a first device to a target device;
   determining, for each task in a plurality of tasks, a first dependency of a task on a data block in the plurality of data blocks, and a second dependency of the task on another task in the plurality of tasks;
   calculating a task weight for each of the tasks, each task weight comprising cumulative sizes of at least one data block corresponding to the first dependency or the second dependency;
   calculating a copy weight of each data block in the plurality of data blocks, including adding a size of a data block to weights corresponding to the second dependency for all of the tasks that depend directly on the data block;
   assigning a highest priority to copying the data block having the largest copy weight; and
   prioritizing the remaining copying and tasks according to at least one of the copy weight and the task weight.

2. The method of claim 1, further comprising:
   performing a plurality of copying, tasks, or a combination of tasks and copying, in parallel.

3. The method of claim 1, wherein calculating the task weight for a task comprises:
   adding the sizes of all of the data blocks on which the task depends, as a first weight;
   adding the first weights of all the other tasks that depend on the task, as a second weight; and
   adding the first and second weights as the task weight.

4. The method of claim 3, wherein calculating the copy weight of the data block comprises:
   adding the size of the data block to the second weights for all of the tasks that depend directly on the data block, as the copy weight.

5. The method of claim 1, further comprising:
   copying the data blocks and performing the tasks according to the prioritization.

6. The method of claim 5, further comprising:
   performing a task only when all of the data blocks on which the task depends are copied.

7. The method of claim 1, further comprising:
   analyzing at least one of: configuration of the target device, configuration of data block storage, and transfer conditions on a transfer medium between the first and target devices; and
   including the analysis in prioritizing the copying and the tasks.

8. The method of claim 1, further comprising:
   receiving an override of a priority for a copying or a task, and prioritizing according to the override.

9. The method of claim 1, further comprising:
   displaying a list of the copying and the tasks in priority order;
   receiving input to accept the order or to re-order the copying and the tasks; and
   performing the copying and tasks according to the received input.

10. An article comprising hardware memory containing instructions that when executed by a processor enable a system to:
    calculate a task weight of a task in an upgrade process, including adding sizes of data blocks on which the task depends, as a first weight, adding the first weights of all of the other tasks that depend on the task as a second weight, and adding the first and second weights as the task weight;
    calculate a copy weight of a data block to be copied during the upgrade process;
    assign a highest priority to copying a data block having the largest copy weight;

prioritize any remaining copying and tasks in the upgrade process according to at least one of the copy weight and the task weight; and copy the data blocks and perform the tasks according to the prioritization.

11. The article of claim 10, wherein the instructions to calculate a copy weight of a data block further comprise instructions that when executed enable the system to:

add the size of the data block to the second weights for all of the tasks that depend directly on the data block, as the copy weight.

12. The article of claim 10, further comprising instructions that when executed enable the system to:

display a list of the copying and the tasks in priority order;

receive input to accept the order or to re-order the copying and the tasks; and perform the copying and tasks according to the received input.

13. The article of claim 10, further comprising instructions that when executed enable the system to:

perform a task only when the data blocks on which the task depends are copied.

14. The article of claim 10, further comprising instructions that when executed enable the system to:

perform a plurality of copying, tasks, or a combination of tasks and copying, in parallel.

15. An apparatus, comprising:

a logic device;

a computer-readable storage medium storing data blocks;

an upgrade prioritizer operating on the logic device to:

calculate a task weight of a task in an upgrade process by adding sizes of dependent data blocks and dependent tasks;

calculate a copy weight of a data block to be copied during the upgrade process by adding a size of the data block to weights for one or more tasks that depend directly on the data block; and prioritize the copying and the tasks in the upgrade process according to at least one of the copy weight and the task weight, wherein a highest priority is assigned to copying a data block having the largest copy weight; and an updater module to copy the data blocks from the computer-readable storage medium to another computer-readable storage medium and perform the tasks according to the priority.

16. The apparatus of claim 15, wherein the updater module performs a plurality of the copying and the tasks in parallel.

17. The apparatus of claim 15, the upgrade prioritizer to calculate the task weight by:

adding the sizes of all of the data blocks on which the task depends, as a first weight;

adding the first weights of all the other tasks that depend on the task, as a second weight; and adding the first and second weights as the task weight.

18. The apparatus of claim 17, the upgrade prioritizer to calculate the copy weight by:

adding the size of the data block to the second weights for all of the tasks that depend directly on the data block, as the copy weight.

19. The apparatus of claim 15, further comprising a display, the upgrade prioritizer further to:

display a list of the copying and the tasks in priority order;

receive input to accept the order or to re-order the copying and the tasks; and adjust the priority of the copying and tasks according to the received input.

\* \* \* \* \*